(12) United States Patent
Kobayashi et al.

(10) Patent No.: US 9,429,820 B2
(45) Date of Patent: Aug. 30, 2016

(54) MOUNTING APPARATUS FOR CAMERA APPARATUS

(71) Applicant: PANASONIC CORPORATION, Osaka (JP)

(72) Inventors: Takafumi Kobayashi, Fukuoka (JP); Jyouji Wada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 34 days.

(21) Appl. No.: 14/465,416

(22) Filed: Aug. 21, 2014

(65) Prior Publication Data

US 2015/0063796 A1 Mar. 5, 2015

(30) Foreign Application Priority Data

Aug. 29, 2013 (JP) .................................. 2013-178016
Jul. 24, 2014 (JP) .................................. 2014-150910

(51) Int. Cl.
*G03B 17/56* (2006.01)
*G08B 13/196* (2006.01)

(52) U.S. Cl.
CPC ....... *G03B 17/561* (2013.01); *G08B 13/19632* (2013.01)

(58) Field of Classification Search
CPC .................. G03B 17/561; G03B 13/19632
USPC ....................................................... 396/427
See application file for complete search history.

(56) References Cited

U.S. PATENT DOCUMENTS

2010/0220183 A1* 9/2010 Yoro ..................... H01L 21/681
348/86
2014/0037283 A1* 2/2014 Cury .................... G03B 17/561
396/428

FOREIGN PATENT DOCUMENTS

| CN | 202674767 U | 1/2013 |
| JP | 2008-92258 A | 4/2008 |
| JP | 2009-10440 A | 1/2009 |
| JP | 4760784 B2 | 8/2011 |

OTHER PUBLICATIONS

Combined Search and Examination Report dated Oct. 31, 2014, for corresponding GB Application No. 1415202.9, 5 pages.

* cited by examiner

*Primary Examiner* — Rochelle-Ann J Blackman
(74) *Attorney, Agent, or Firm* — Seed IP Law Group PLLC

(57) ABSTRACT

A mounting apparatus for a camera apparatus is provided to be mounted on a mounting surface of a construction to support the camera apparatus. The mounting apparatus includes a first frame, a second frame, an interconnecting member that interconnects the first frame and the second frame, a mounting member that is arranged between the first frame and the second frame, wherein the camera apparatus can be mounted on the mounting member, and a moving unit, configured to move the mounting member between the first frame and the second frame. The mounting member is fixable at an arbitrary position by the moving unit.

7 Claims, 14 Drawing Sheets

MOUNTING APPARATUS FOR CAMERA APPARATUS

BACKGROUND OF THE INVENTION

1. Field of the Invention

The present invention relates to a mounting apparatus for a camera apparatus, that is used when installing the camera apparatus such as a monitoring video camera or the like to be embedded in the ceiling.

2. Description of the Related Art

In the related art, there is a case of installing a monitoring video camera to be embedded in the ceiling or a wall. In such a case, a mounting apparatus is used (refer to Japanese Patent No. 4760784, for example).

As illustrated in FIGS. 14A to 14C, as disclosed in Japanese Patent No. 4760784, an embedding metal fitting (mounting apparatus) 100 has a body portion 101, an interposition base portion 102 that is away from the body portion 101 by a predetermined distance, and a plurality of connection portions 103 that connect the body portion 101 to the interposition base portion 102. As the connection portion 103, there is a connection portion provided with an interposition blade portion 104 that interposes a ceiling piece between the interposition blade portion 104 and the interposition base portion 102. The interposition blade portion 104 vertically moves in response to rotations of an interposition height adjustment screw portion 105.

Accordingly, in order to fix the embedding metal fitting 100 to the ceiling piece, initially, a hole that allows the body portion 101 to be inserted but does not allow the interposition base portion 102 to be inserted is provided in the ceiling piece, thereby inserting the body portion 101 therein.

Subsequently, when the interposition height adjustment screw portion 105 is continuously rotated, the interposition height adjustment screw portion 105 rotates until the interposition blade portion 104 comes into contact with an interposition blade stopper portion 106. When the interposition height adjustment screw portion 105 is further rotated, the interposition blade portion 104 gradually descends in a direction toward the interposition base portion 102, thereby interposing the ceiling piece between the interposition blade portion 104 and the interposition base portion 102.

In the body portion 101, a slide portion 107 is provided. The slide portion 107 is fixedly accommodated inside the body portion 101 by fixing a slide portion fixing hole portion 108 of the body portion 101 and a slide portion accommodation fixing screw hole portion 109 to each other with a screw. Accordingly, when slidingly drawing out the slide portion 107, the above-described fixing screw is unscrewed and the slide portion 107 is drawn out downward. Then, a draw-out stop screw portion 110 comes into contact with a draw-out stop reception portion 111 of the body portion 101, and thus, the slide portion 107 can be drawn out to an arbitrary length which has set in advance.

SUMMARY OF THE INVENTION

However, in an embedding metal fitting 100 disclosed in Japanese Patent No. 4760784 described above, although a slide portion 107 on which a camera portion is mounted can be drawn down from a mounting position to a predetermined position, the slide portion 107 cannot be fixed to an arbitrarily desired position.

Meanwhile, in regard to the camera apparatuses, the heights thereof are different from each other, such as a slim-type camera apparatus of which a design is concerned, a strengthened type camera apparatus of which a casing is reinforced. Therefore, there has been a problem that development is required to respectively provide embedding metal fittings for various types of the camera apparatuses having heights different from each other.

One non-limited object of the present invention is to provide a mounting apparatus to which a camera apparatus can be fixed in a desired position and which can be flexibly coordinated with the various types of camera apparatuses having heights different from each other.

A mounting apparatus for a camera apparatus is provided to be mounted on a mounting surface of a construction to support the camera apparatus. The mounting apparatus includes a first frame, a second frame, an interconnecting member that interconnects the first frame and the second frame, a mounting member that is arranged between the first frame and the second frame, wherein the camera apparatus can be mounted on the mounting member, and a moving unit, configured to move the mounting member between the first frame and the second frame. The mounting member is fixable at an arbitrary position by the moving unit.

DETAILED DESCRIPTION OF THE EXEMPLARY EMBODIMENTS

Hereinafter, a mounting apparatus for a camera apparatus according to an embodiment of the present invention will be described with reference to the drawings.

Figure 1:
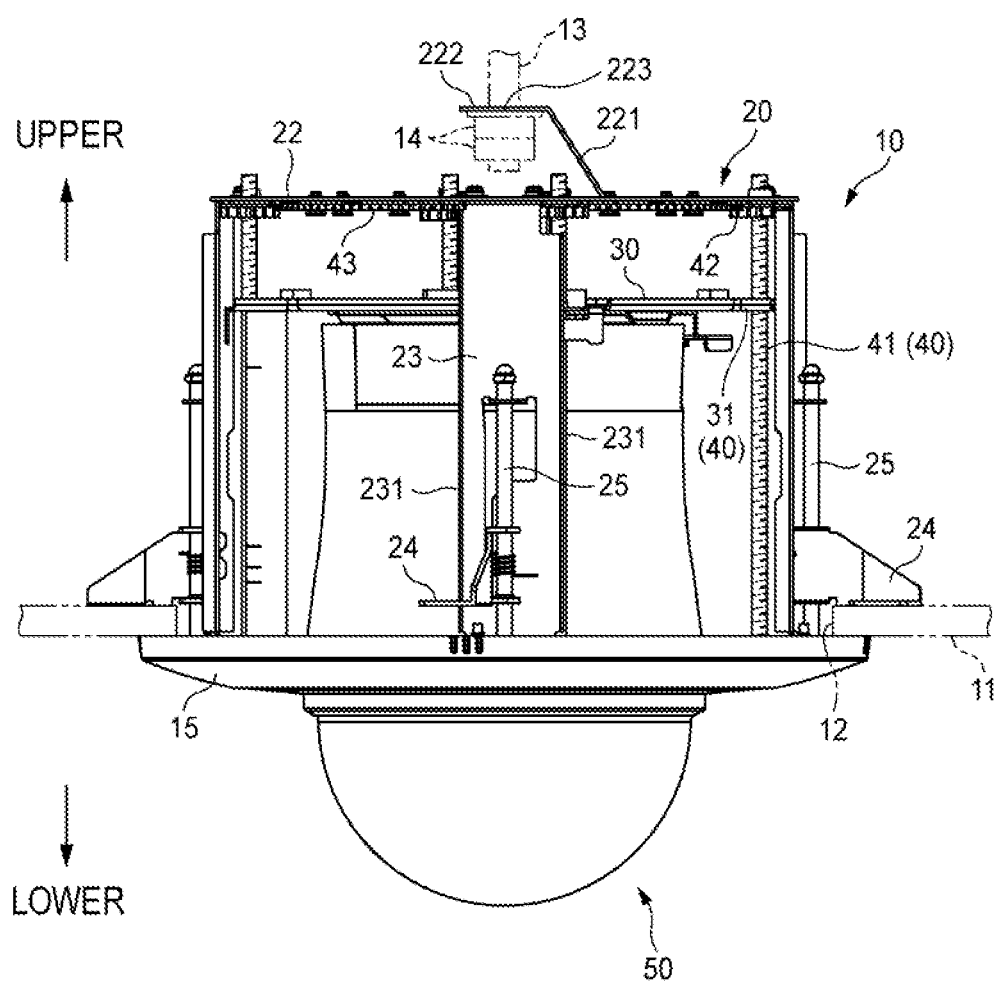
FIG. 1 is a side view of a camera apparatus in a state of being mounted on a ceiling surface by using a mounting apparatus for a camera apparatus according to an embodiment of the present invention.

FIG. 1 is a side view of a camera apparatus in a state of being mounted on a ceiling surface by using the mounting apparatus for a camera apparatus according to the embodiment of the present invention.

As illustrated in FIG. 1, a mounting apparatus 10 for a camera apparatus (hereinafter, referred to as "mounting apparatus 10") according to the embodiment can be used to mount a camera apparatus 50 such as a monitoring camera and the like in a mounting hole 12 provided in a ceiling surface 11 that is a mounting surface of a construction in a downward direction.

In the following description, a floor side (a side opposite to the ceiling surface 11) denotes a "lower", and a side opposite to the floor side denotes an "upper".

Figure 2:
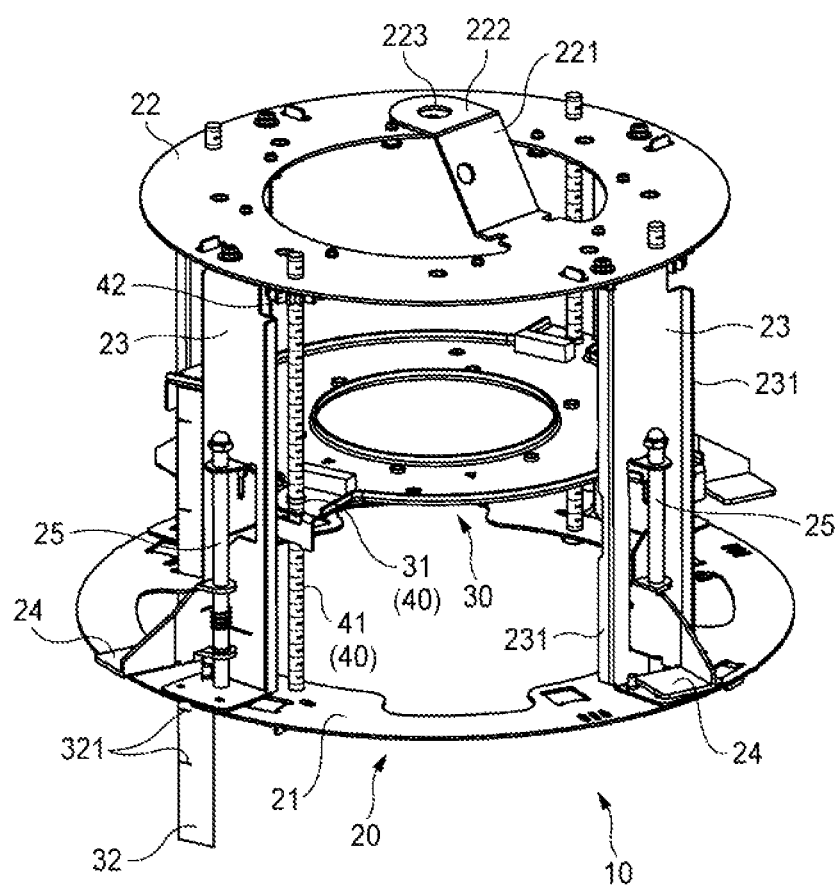
FIG. 2 is a perspective view of the mounting apparatus for a camera apparatus according to the embodiment of the present invention, seen from above.
Figure 3:
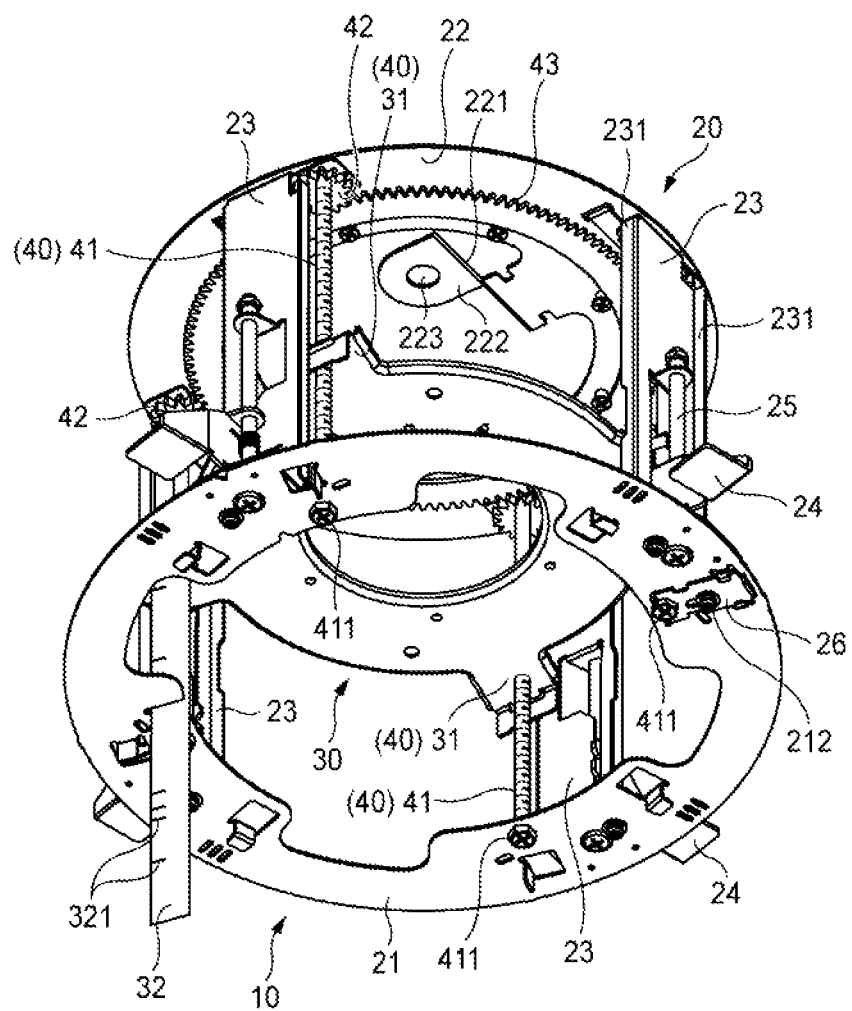
FIG. 3 is another perspective view of the mounting apparatus for a camera apparatus according to the embodiment of the present invention, seen from below.

FIG. 2 is a perspective view of the mounting apparatus for a camera apparatus according to the embodiment of the present invention, seen from above. FIG. 3 is another perspective view of the mounting apparatus for a camera apparatus according to the embodiment of the present invention, seen from below. As illustrated in FIGS. 2 and 3, the mounting apparatus 10 includes a body 20 that is fixed in the mounting hole 12, and a mounting member 30 that moves upward and downward while having the camera apparatus 50 mounted therein.

The body 20 includes an annular disk-shaped lower frame 21 that is a second frame mounted to be in parallel to the mounting hole 12, and an annular disk-shaped upper frame 22 that is a first frame arranged above the lower frame 21 being away therefrom at a predetermined interval and accommodated in the mounting hole 12. The lower frame 21 and the upper frame 22 are fixed by a plurality of interconnecting members 23 (herein, four interconnecting members) to be in parallel to each other at a predetermined interval.

The lower frame 21 has an outer diameter larger than an inner diameter of the mounting hole 12 so as not to be able to be inserted in the mounting hole 12. The upper frame 22 has an outer diameter smaller than the inner diameter of the mounting hole 12 so as to be able to be inserted in the mounting hole 12.

Accordingly, when the mounting apparatus 10 is in a state of being mounted in the mounting hole 12, an upper surface of the lower frame 21 abuts on the ceiling surface 11, thereby being exposed. Therefore, in the exposed lower frame 21, a decorative cover (cover) 15 is demountably mounted so as to cover a lower surface of the lower frame 21 (refer to FIG. 1).

In the upper frame 22, a mounting arm 221 is provided inwardly and upwardly, and a tip portion 222 is formed to be horizontally bent. In the tip portion 222, an anchor hole 223 is provided in a central position of the upper frame 22.

Accordingly, an anchor bolt 13 mounted on a structural member in a ceiling space is inserted into the anchor hole 223 of the mounting arm 221 and is fixed by a nut 14, thereby suspending the body 20 (refer to FIG. 1).

The interconnecting members 23 are plate-shaped members. Reinforcement ribs 231 of the interconnecting members 23 are formed to be bent at edges opposite to each other thereof in a width direction.

A guide member 25 is provided in a lower portion of the interconnecting members 23, and a pressing member 24 is formed in the guide member 25 to be vertically movable.

The pressing member 24 is rotatable about the guide member 25 so as to rotate between an accommodation position that can be inserted into the mounting hole 12 and a mounting position that protrudes further outward than the lower frame 21. In addition, the pressing member 24 is biased downward (in a direction of the lower frame 21) in the mounting position.

Between the lower frame 21 and the upper frame 22 of the body 20, the annular disk-shaped mounting member 30 is provided to be movable upward and downward. On a lower surface of the mounting member 30, the camera apparatus 50 can be mounted.

In the mounting member 30, a strip member 32 indicating a position with respect to the ceiling surface 11 of the mounting member 30 is mounted. The strip member 32 is formed with a soft foldable member such as cloth, and a marking 321 is calibrated thereto to respectively indicate appropriate positions for various types of cameras having heights different from each other.

The strip member 32 has a length so as to protrude its lower end further downward than the lower frame 21 when the mounting member 30 is placed in the highest position closest to the upper frame 22.

Between the lower frame 21 and the upper frame 22, there is provided an up-down moving unit 40 that is a moving unit, configured to move the mounting member 30 upward and downward, and can fix the mounting member 30 in a position at an arbitrary height.

The up-down moving unit 40 includes a plurality of screw members 41 that are rotatable and are vertically provided between the lower frame 21 and the upper frame 22. Here, there are respectively provided four of the screw members 41 in quartered positions along a circumferential direction of the lower frame 21 and the upper frame 22. The number of the screw members 41 is not limited to four. It is preferable to provide three or more of the screw members 41 at uniform intervals in parallel to each other.

In an upper end portion of each of the screw members 41, a planetary gear 42 is fixed thereto. The planetary gear 42 rotates along the lower surface of the upper frame 22.

On the inner side of the planetary gear 42 of each of the screw members 41, an internal gear 43 that meshes with all of the planetary gears 42 is provided to be rotatable along the lower surface of the upper frame 22.

Otherwise, in place of the internal gear 43, it is also possible to provide a sun gear (external gear) that meshes with the outer side of all of the planetary gears 42 to be rotatable along the lower surface of the upper frame 22. Here, a case of using the internal gear 43 will be described.

Accordingly, all of the planetary gears 42 rotate synchronously in association with the internal gear 43, and thus, all of the screw members 41 rotate synchronously.

In this description, the term "internal gear" is used to denote an inner side gear which is arranged on the inner side of each of the planetary gears 42 and is different from an internal gear in which a pinion gear is inscribed. In addition, the term "external gear" is used to denote an outer side gear which is arranged on the outer side of each of the planetary gears 42 and is different from an external gear in which the pinion gear is circumscribed.

Figure 4:
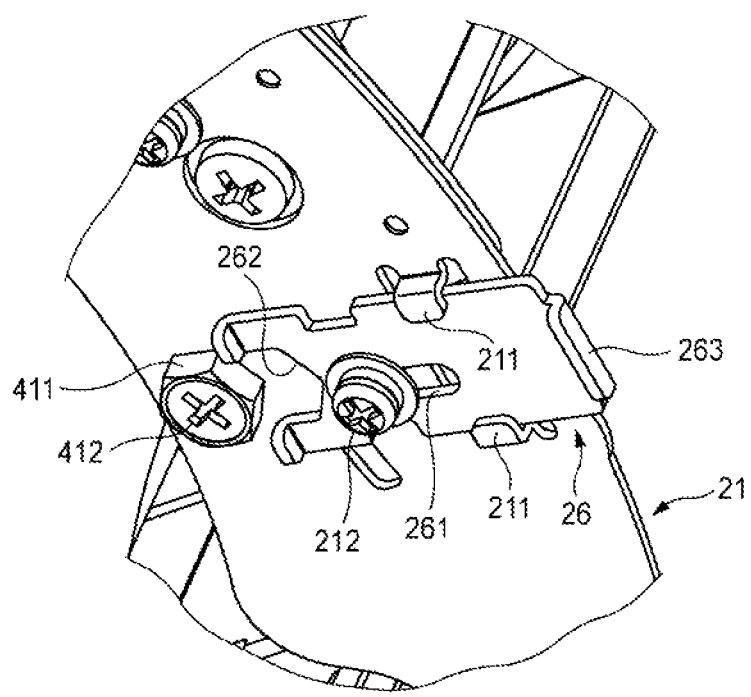
FIG. 4 is a perspective view of a regulation member that can regulate rotations of a screw member.

FIG. 4 is a perspective view of a regulation member that can regulate rotations of the screw member. As illustrated in FIG. 3, in a lower end portion of each of the screw members 41, there is provided a screw head (fixing nut portion) 411 that penetrates through the lower frame 21 and is exposed through the lower surface of the lower frame 21. The screw head 411 has a hexagonal shape, and concave portions 412 that fit the tip end of a screw driver is provided on a lower surface thereof (refer to FIG. 4).

Accordingly, when any one of the screw heads 411 of the screw members 41 is rotated by a screw driver, the planetary gear 42 that is mounted on this screw member 41 causes the internal gear 43 to rotate, and thus, all of the screw members 41 rotate synchronously.

In each of the screw members 41, an up-down moving nut portion 31 that is a nut portion of the mounting member 30 is screwed thereto. The up-down moving nut portion 31 can be provided by forming a screw hole in the mounting member 30. Otherwise, the up-down moving nut portion 31 can also be provided by providing a penetration hole in the mounting member 30 and allowing a nut that is screwed to the screw member 41 to be bonded to the penetration hole.

Accordingly, by rotating the screw member 41, the up-down moving nut portion 31 moves upward and downward along the screw member 41, and thus, the mounting member 30 can be moved upward and downward.

Figure 5:
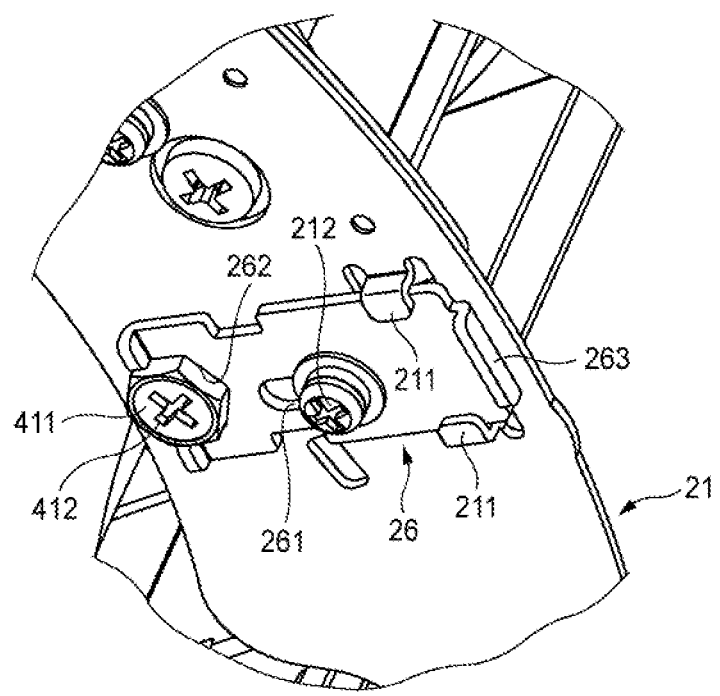
FIG. 5 is a perspective view illustrating a state where the rotations of the screw member are regulated by the regulation member.

FIG. 5 is a perspective view illustrating a state where the rotations of the screw member are regulated by the regulation member. As illustrated in FIGS. 4 and 5, in the vicinity of at least any one of the screw heads 411 of the screw members 41, there is provided a regulation member (fixing unit) 26 that can regulate rotations of the screw heads 411.

The regulation member 26 has a substantially rectangular plate shape in its entirety and is supported to be slidable along a radial direction of the lower frame 21 on account of a pair of guide pieces 211 that are provided on the lower surface of the lower frame 21 by cutting and raising. In a central portion of the regulation member 26, there is provided an opening portion 261 along the radial direction of the lower frame 21. In the opening portion 261, a fixing screw 212 that regulates sliding of the regulation member 26 is mounted.

In an inner side end of the regulation member 26, there is provided a fitting concave portion 262 which the screw head 411 of the screw member 41 can fit. The fitting concave portion 262 has a shape formed of a portion of a hexagon in order to restrain the rotations of the hexagonal screw head 411 in a fit state (regulated position).

The regulation member 26 is slidable or selectable in position between the regulated position where the rotations of the screw head 411 are regulated when the regulation member 26 is engaged with the screw head 411 and a deregulated position where the rotations of the screw head 411 are deregulated when the regulation member 26 is separated from the screw head 411.

An outer side end portion of the regulation member 26 includes a protrusion portion 263 that protrudes outward from an outer peripheral edge of the lower frame 21 in the deregulated position where the regulation member 26 is separated from the screw head 411 to deregulate the rotations thereof (refer to FIG. 4). In the regulated position where the rotations of the screw head 411 are regulated, the protrusion portion 263 does not protrude outward from the lower frame 21 (refer to FIG. 5).

In other words, when the regulation member 26 is in the regulated position, the decorative cover 15 can be mounted on the lower frame 21. However, when the regulation member 26 is in the deregulated position, the decorative cover 15 cannot be mounted on the lower frame 21.

Accordingly, the regulation member 26 is slid from the deregulated position to the regulated position so as not to forget the operation to prevent the rotations of the screw member 41.

Figure 6:
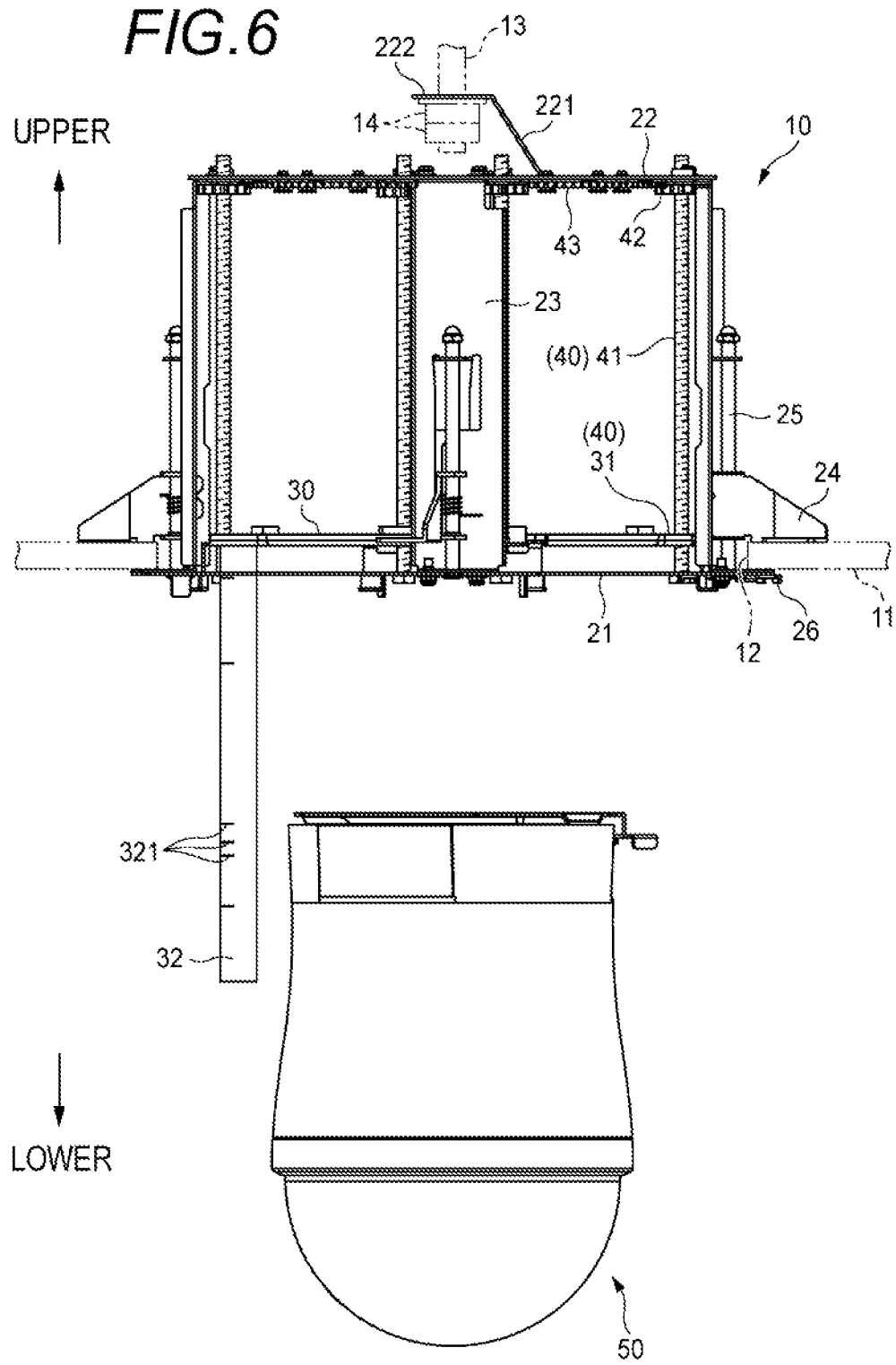
FIG. 6 is a side view of the camera apparatus in a state of being mounted on the mounting apparatus after the mounting apparatus is mounted in a mounting hole of the ceiling surface.
Figure 7:
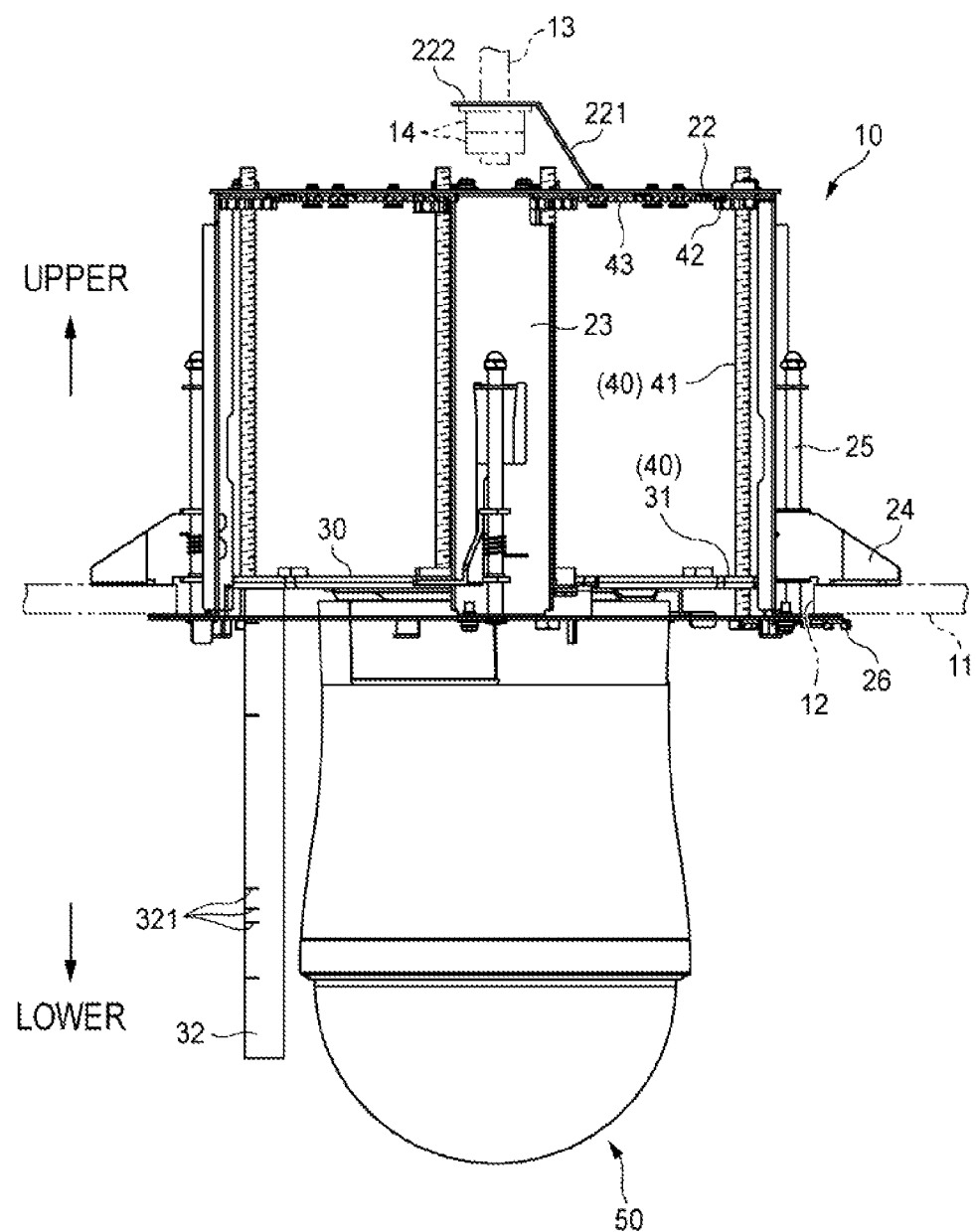
FIG. 7 is a side view of the camera apparatus in a state of being mounted on the mounting apparatus that is mounted in the mounting hole of the ceiling surface.
Figure 8:
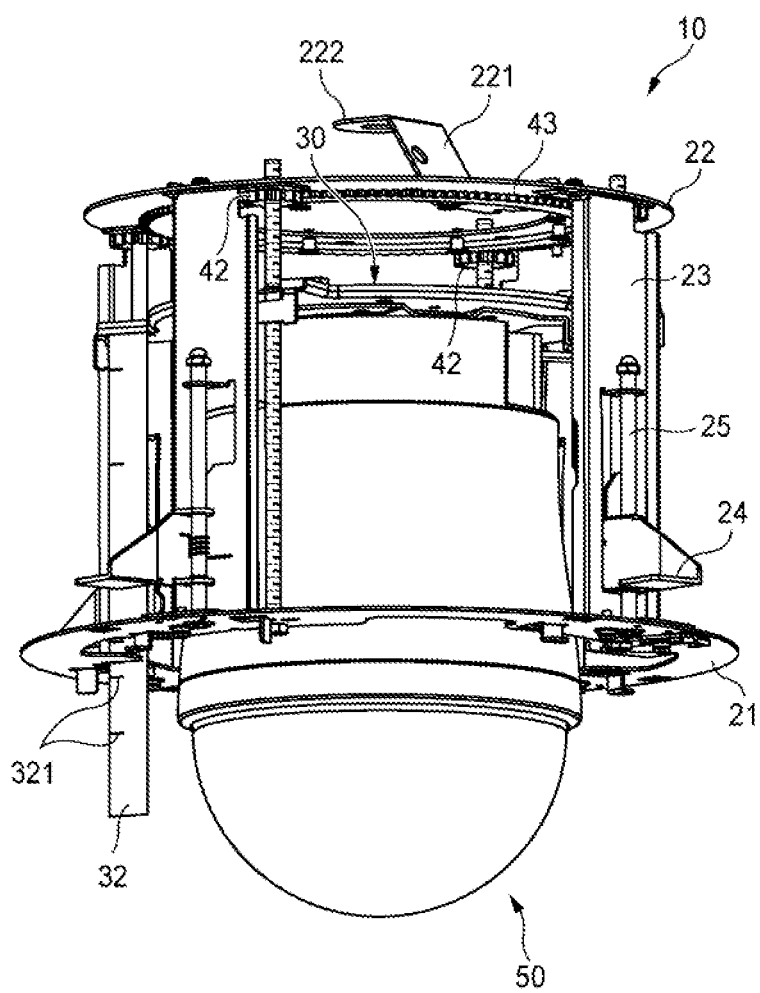
FIG. 8 is a perspective view of a state of adjusting a height position of the camera apparatus that is mounted on the mounting apparatus, seen from below.
Figure 9:
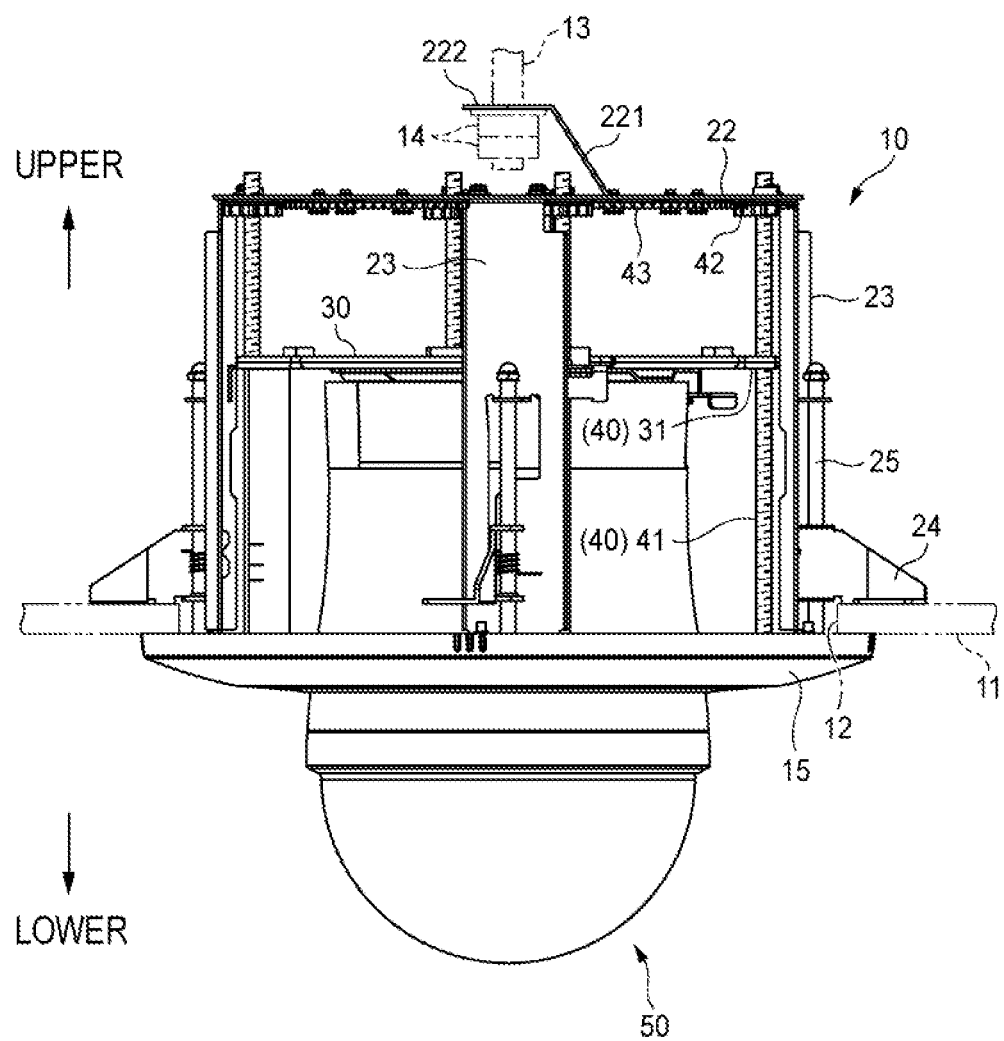
FIG. 9 is a side view of the camera apparatus in a state where the camera apparatus is mounted in a position at a desired height.
Figure 10:
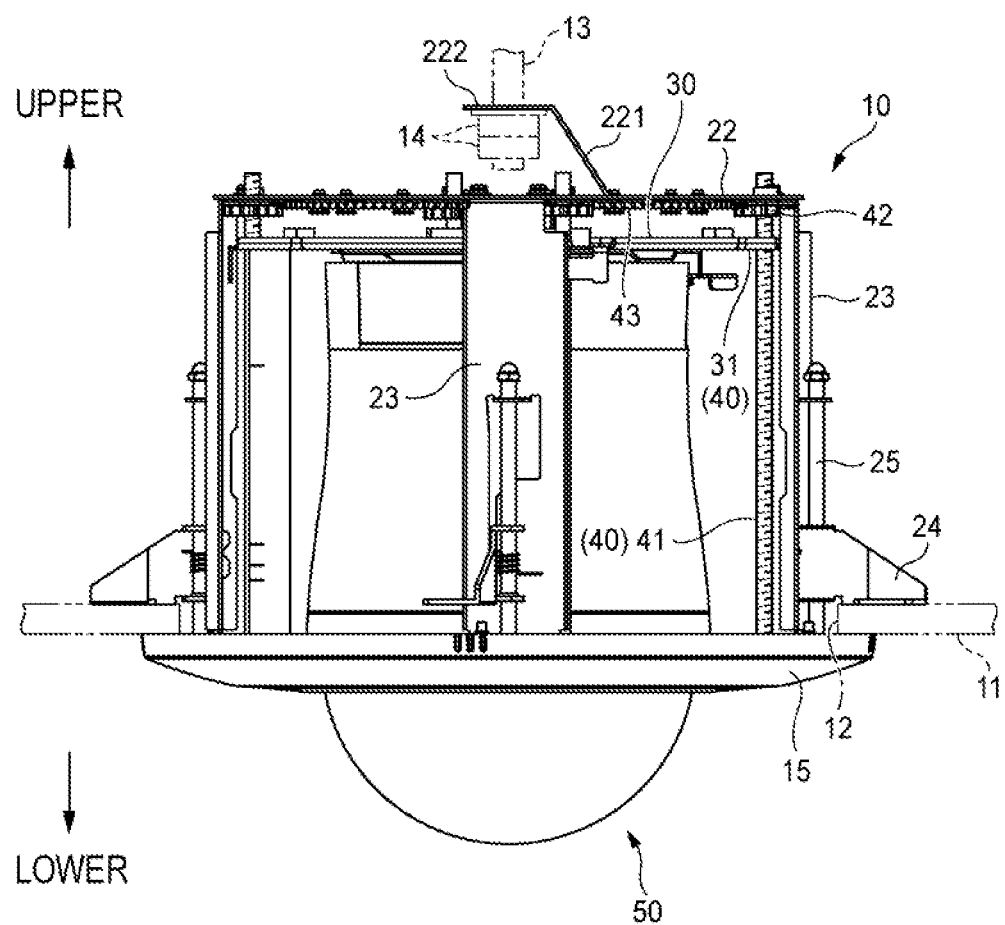
FIG. 10 is a side view of the camera apparatus in a state where the camera apparatus is mounted in the highest position.

Subsequently, a mounting operation of the mounting apparatus 10 and the camera apparatus 50 with respect to the mounting hole 12 in the ceiling surface 11 will be described. FIG. 6 is a side view of the camera apparatus 50 in a state of being mounted on the mounting apparatus 10 after the mounting apparatus 10 is mounted in the mounting hole 12 in the ceiling surface 11. FIG. 7 is a side view of the camera apparatus 50 in a state of being mounted on the mounting apparatus 10 which is mounted in the mounting hole 12 in the ceiling surface 11. FIG. 8 is a perspective view of the camera apparatus 50 in a state of adjusting a height position of the camera apparatus 50 that is mounted on the mounting apparatus 10, seen from below. FIG. 9 is a side view of the camera apparatus 50 in a state where the camera apparatus 50 is mounted in a position at a desired height. FIG. 10 is a side view of the camera apparatus 50 in a state where the camera apparatus 50 is mounted in the highest position.

Initially, when the mounting apparatus 10 is mounted in the mounting hole 12 in the ceiling surface 11, the pressing member 24 is rotated about the guide member 25, thereby being accommodated inside the mounting apparatus 10. In this state, the upper frame 22 is inserted into the mounting hole 12, and the anchor bolt 13 in the ceiling space is inserted through the anchor hole 223 that is provided in the tip portion 222 of the mounting arm 221 of the upper frame 22. The anchor bolt 13 is fixed by using the nut 14. The nut 14 is used as a double nut, thereby preventing looseness (refer to FIG. 1).

Subsequently, the pressing member 24 is rotated about the guide member 25 so as to protrude outward. The pressing member 24 is moved downward, thereby fixing the mounting apparatus 10 by pinching a ceiling piece between the pressing member 24 and the lower frame 21.

The fixing screw 212 provided in the lower frame 21 is loosened, and the regulation member 26 is moved outward, thereby being positioned in the deregulated position (refer to FIG. 4). In this state, the screw head 411 of the screw member 41 is rotated by using a screw driver, and the mounting member 30 is moved to the lowest position (refer to FIG. 6). In this case, the strip member 32 extends downward being suspended.

Subsequently, the camera apparatus 50 is mounted on the mounting member 30 (refer to FIG. 7).

Then, the screw head 411 of the screw member 41 is rotated by using a screw driver so as to raise the mounting member 30 on which the camera apparatus 50 is mounted in a position at a desired height. In this case, an operator adjusts the height position while watching the marking 321 of the strip member 32 so that the camera apparatus 50 can be easily fixed at an appropriate position (refer to FIG. 8).

When a protruding amount of the camera apparatus 50 with respect to the ceiling surface 11 is completely adjusted, the regulation member 26 is slid inward so as to cause the screw head 411 of the screw member 41 to fit the fitting concave portion 262, thereby fixing the screw member 41 not to rotate. In this manner, despite of being installed for a long period, it is possible to prevent the mounting member 30 from being deviated downward in position. Thereafter, the fixing screw 212 is fastened to fix the regulation member 26 so as not to allow the regulation member 26 to be detached from the screw head 411 (refer to FIG. 5).

Lastly, the strip member 32 is rolled upward to be accommodated in the mounting member 30 on an upper side, and thus, the decorative cover 15 is mounted from below the lower frame 21 (refer to FIG. 9).

FIGS. 1 and 9 illustrate states where the camera apparatus 50 is fixed in a position at a desired height. In addition, FIG. 10 illustrates a state where the camera apparatus 50 is mounted in the highest position.

Subsequently, an operational effect of the mounting apparatus 10 for a camera apparatus will be described.

The mounting apparatus 10 is inserted through the mounting hole 12 provided in the ceiling surface 11 and is mounted therein, thereby supporting the camera apparatus 50. The mounting apparatus 10 includes the upper frame 22 and the lower frame 21 that are parallel to the mounting hole 12 and are arranged away from each other. The upper frame 22 and the lower frame 21 are connected by the interconnecting members 23.

The camera apparatus 50 is mounted on the mounting member 30 that is arranged between the upper frame 22 and the lower frame 21. Between the upper frame 22 and the lower frame 21, the mounting member 30 is moved upward and downward by the up-down moving unit 40 and is fixed at an arbitrary position.

Therefore, the camera apparatus 50 can be in use by being drawn down to a desired position from the ceiling surface 11 and being fixed to the position.

In addition, in the mounting apparatus 10, the up-down moving unit. 40 for causing the mounting member 30 on which the camera apparatus 50 is mounted to move upward and downward has the screw member 41 that stands between the upper frame 22 and the lower frame 21, and the up-down moving nut portion 31 that is screwed to the screw member 41. The up-down moving nut portion 31 is provided in the mounting member 30.

Therefore, by rotating the screw member 41, the up-down moving nut portion 31 that is provided in the mounting member 30 and is screwed to the screw member 41 moves upward and downward, and thus, it is possible to move the camera apparatus 50 upward and downward.

In addition, in the mounting apparatus 10, the up-down moving unit 40 has a plurality of combinations of the screw member 41 and the up-down moving nut portion 31, and thus, it is possible to cause the mounting member 30 on which the camera apparatus 50 is mounted to stably move upward and downward.

In addition, the mounting apparatus 10 has the planetary gears 42 that are provided in each of the screw members 41 along any one of the upper frame 22 and the lower frame 21, and the internal gear 43 that meshes with each of the planetary gears 42.

Accordingly, by rotating the internal gear 43, all of the planetary gears 42 can rotate, and thus, all of the screw member 41 can rotate. In addition, on account of operations of the internal gear 43 and the planetary gear 42, each of the screw members 41 rotates synchronously, and thus, the mounting member 30 can move upward and downward while maintaining a horizontal state.

Therefore, it is possible to cause the mounting member 30 on which the camera apparatus 50 is mounted to stably move upward and downward to a desired position. As a result, an imaging range of the camera apparatus 50 becomes adjustable, and thus, it is possible to widen an application range of a camera installation site.

In addition, the mounting apparatus includes the fixing unit, configured to fix the mounting member 30 at an arbitrary position between the upper frame 22 and the lower frame 21. As the fixing unit, the mounting apparatus has the fixing nut portion 411 that is provided in the screw member 41, and the regulation member 26 that can regulate rotations of the fixing nut portion 411. The regulation member 26 is selectable in position between the regulated position where the rotations of the fixing nut portion 411 are regulated by being engaged with the fixing nut portion 411 and the deregulated position where the rotations of the fixing nut portion 411 are deregulated by being separated from the fixing nut portion 411.

Therefore, it is possible to prevent the screw member 41 from being loosened and to prevent the mounting member 30 from being deviated downward.

In addition, when the regulation member 26 is in the deregulated position, at least a portion of the regulation member 26 protrudes outward from a planar contour of the lower frame 21.

Accordingly, when the regulation member 26 is in the deregulated position, the decorative cover 15, which is otherwise mounted on the lower frame 21 and protrudes from the ceiling surface 11, cannot be mounted on the lower frame 21. Therefore, in a case where the decorative cover 15 cannot be mounted on the lower frame 21, the screw head 411 is not fixed at the regulated position by the regulation member 26, and thus, it is possible to alert an operator not to forget the operation to prevent the rotations of the screw member 41.

Moreover, in the mounting member 30 of the mounting apparatus 10, there is provided the strip member 32 that extends to the lower frame 21 when the mounting member 30 is in the highest position. Since the strip member 32 has the marking 321, a height position of the mounting member 30 from the ceiling surface 11 can be easily confirmed.

In addition, since the strip member 32 is formed with the soft member, it is possible to fold the strip member 32 to be accommodated inside the mounting apparatus 10 after the height position is checked.

In the present embodiment, four of the screw members 41 are synchronously rotated by the internal gear 43 via the planetary gear 42. However, the screw members 41 may be synchronously rotated by an alternative tool such as a timing belt.

In addition, in the present embodiment, the planetary gear 42 is rotated along the lower surface of the upper frame 22. However, the planetary gear 42 may be rotated along an upper surface of the upper frame 22 or an upper surface of the lower frame 21. In addition, the screw head 411 of the screw member 41 may be a triangle or a square in place of the hexagon. In place of the marking 321 of the strip member 32, a scale indicating an amount of downward protrusion from the ceiling surface 11 may be calibrated thereto.

Subsequently, a modification example of the mounting apparatus according to the aforementioned embodiment will be described with reference to the drawings.

Figure 11:
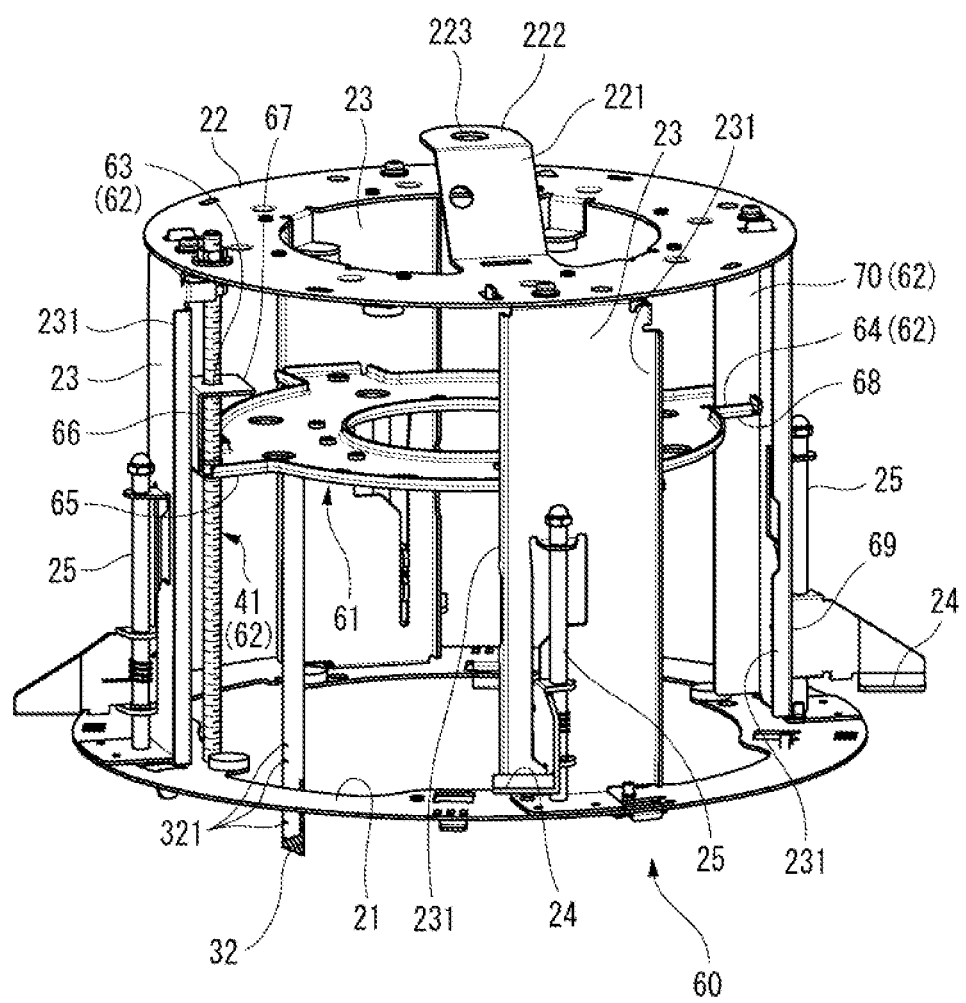
FIG. 11 is a perspective view of a mounting apparatus for a camera apparatus in a modification example, seen from above.
Figure 12:
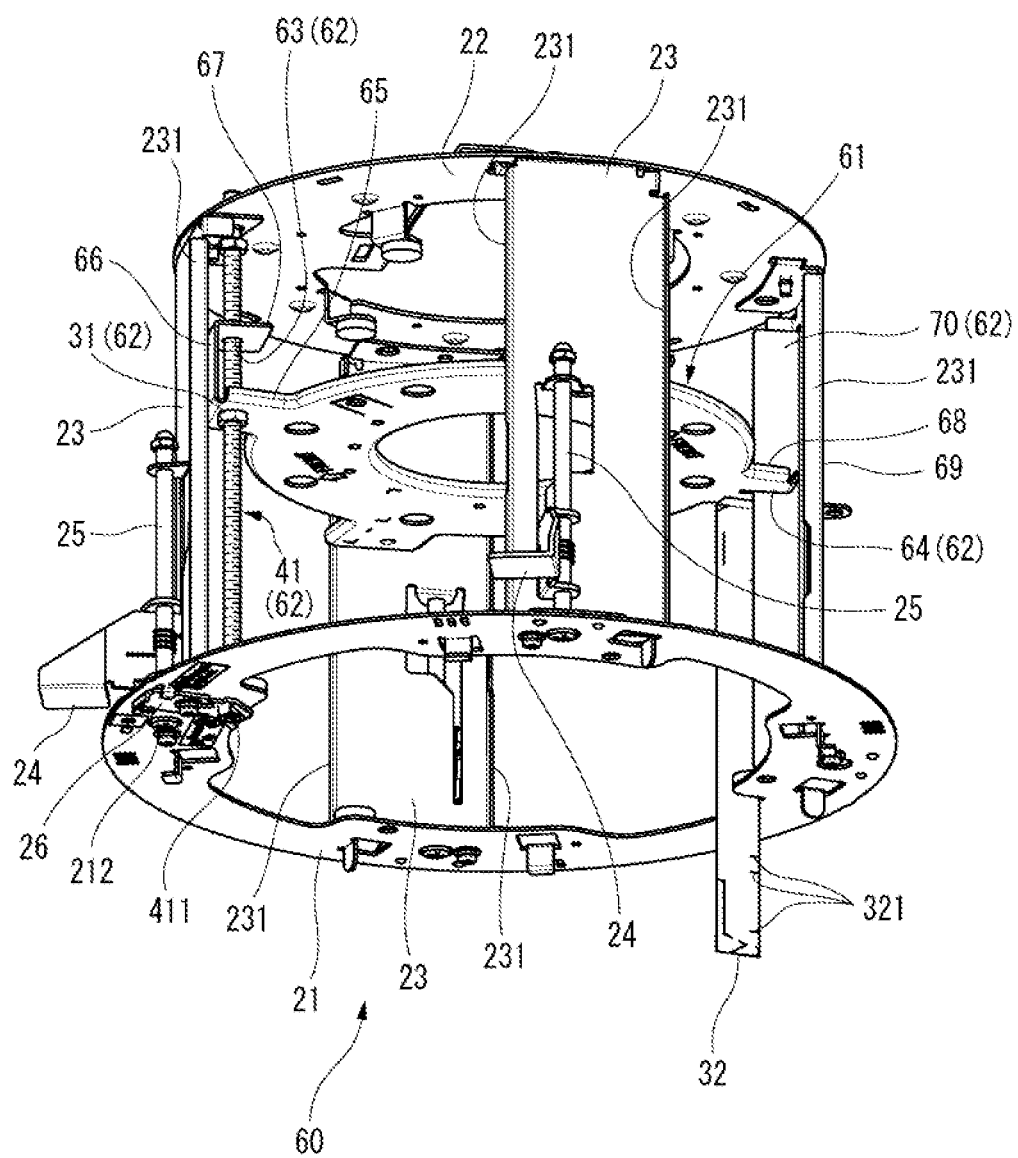
FIG. 12 is a perspective view of the mounting apparatus for a camera apparatus illustrated in FIG. 11, seen from below.
Figure 13:
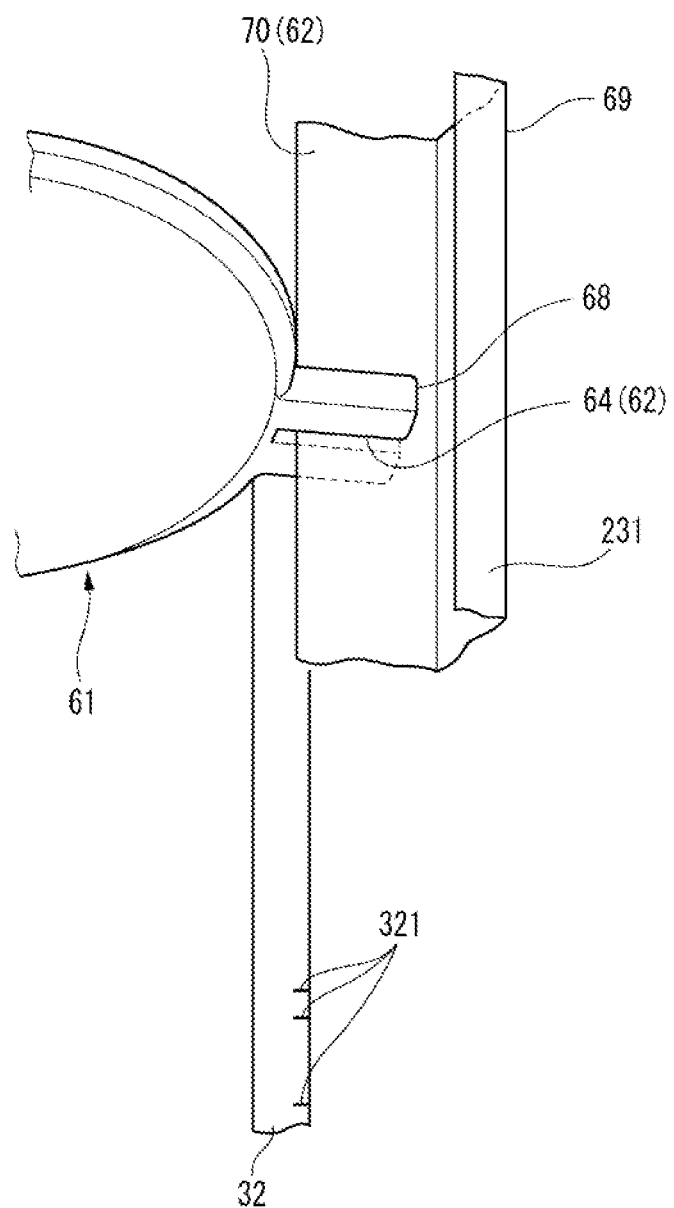
FIG. 13 is an enlarged view of a main portion in the vicinity of a guide slit illustrated in FIG. 12.
Figure 14A:
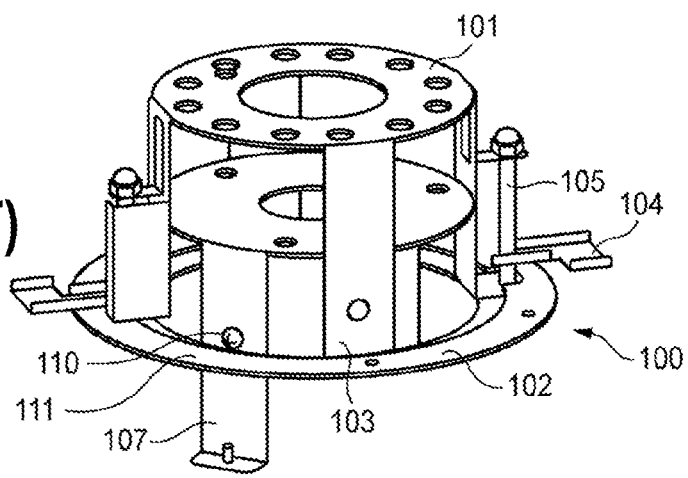
FIG. 14A is a perspective view of an embedding metal fitting mechanism of a monitoring video camera in the related art, seen from diagonally above.
Figure 14B:
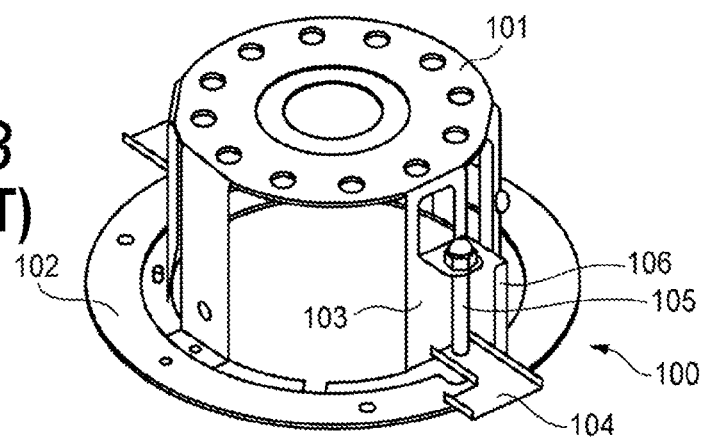
FIG. 14B is a perspective view of the same, seen from diagonally above in another angle.
Figure 14C:
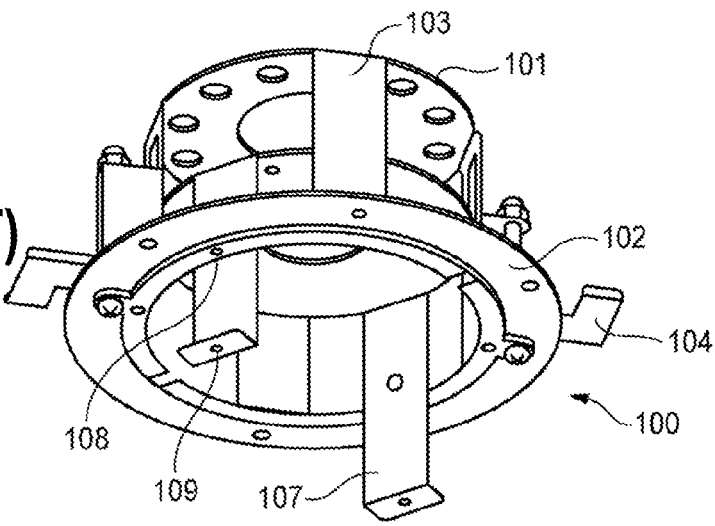
FIG. 14C is a perspective view of the same, seen from diagonally below.

FIG. 11 is a perspective view of a mounting apparatus 60 for the camera apparatus in the modification example, seen from above. FIG. 12 is a perspective view of the mounting apparatus 60 for a camera apparatus illustrated in FIG. 11, seen from below. FIG. 13 is an enlarged view of a main portion in the vicinity of a guide slit illustrated in FIG. 12. The same reference numerals and signs will be applied to the same members as in FIGS. 1 to 10, thereby omitting the overlapping descriptions.

In the mounting apparatus 60 according to the modification example, there is provided an up-down moving unit 62 that is a moving unit, configured to move the mounting member 61 upward and downward, and can be fixed in a position at an arbitrary height between the lower frame 21 and the upper frame 22.

The up-down moving unit 62 has one screw member 41 that is rotatable and is vertically provided between the lower frame 21 and the upper frame 22. In a lower end portion of the screw member 41, there is provided the screw head 411 that penetrates through the lower frame 21 and is exposed through the lower surface of the lower frame 21. In the screw member 41, the up-down moving nut portion 31 that is a nut portion of the mounting member 61 is screwed thereto. The up-down moving nut portion 31 is a member configuring the up-down moving unit 62.

Accordingly, by rotating the screw member 41, the up-down moving nut portion 31 moves upward and downward along the screw member 41, and thus, the mounting member 61 can be moved upward and downward by the up-down moving unit 62. In the vicinity of the screw head 411 of the screw member 41, there is provided the regulation member 26 that can regulate the rotations of the screw head 411 (refer to FIG. 12).

The up-down moving unit 62 has a guide hole 63 and a guide slit 64. On one end side of the mounting member 61 in a diameter direction, a protrusion piece 65 that protrudes radially outward is formed. At the protruding tip end of the protrusion piece 65, an erected piece 66 bent at a right angle is formed. In an upper end of the erected piece 66, a guide piece 67 bent at a right angle so as to be parallel to the mounting member 61 is formed. The protrusion piece 65 has a penetration hole, and the up-down moving nut portion 31 is fixed coaxially with the penetration hole.

In the guide piece 67, the above-described guide hole 63 that is coaxial with the penetration hole in the protrusion piece 65 is formed. The screw member 41 screwed to the up-down moving nut portion 31 penetrates through the guide hole 63. The guide hole 63 supports the mounting member 61 to be horizontally movable by allowing the screw member 41 screwed to the up-down moving nut portion 31 to penetrate therethrough.

In addition, on the other end side of the mounting member 61 in the diameter direction, a rotation regulating piece 68 protruding radially outward is formed. In the rotation regulating piece 68, the above-described guide slit 64 that is notched radially inward to the mounting member 61 is formed.

In the mounting apparatus 60, three interconnecting members out of four are the interconnecting members 23 similar to that described above, and one thereof in a position facing the rotation regulating piece 68 becomes an interconnecting member 69 different from the interconnecting members 23 described above. In the interconnecting member 69, the reinforcement ribs 231 similar to that described above is formed in one side portion, and a guide rib 70 having a width wider than the reinforcement ribs 231 is formed in the other side portion. In the interconnecting member 69, both the reinforcement ribs 231 and the guide rib 70 are bent inward to the mounting member 61.

As illustrated in FIG. 13, the guide slit 64 notched in the rotation regulating piece 68 pinches the guide rib 70 of the interconnecting member 69. In other words, the guide slit 64 regulates the rotations of the mounting member 61 rotating about the screw member 41 by pinching the guide rib 70 of the interconnecting member 69.

A pair of interconnecting members 23 interposing the interconnecting member 69 therebetween and facing each other abut on an outer periphery of ends opposite to each other of the mounting member 61 in the diameter direction.

That is, when moving upward and downward, the outer periphery of the mounting member 61 on sides opposite to each other slides on the pair of the interconnecting members 23. Therefore, in the mounting apparatus 60, the mounting member 61 is prevented from laterally oscillating even though a vibration such as an earthquake occurs.

In this modification example, the up-down moving unit 62 includes the screw member 41, the up-down moving nut portion 31, the guide hole 63 the guide slit 64, and the guide rib 70.

A mounting operation of the mounting apparatus 60 is similar to that of the mounting apparatus 10 described above. However, in the mounting apparatus 60, there is one screw member 41 lifting the mounting member 61 on which the camera apparatus 50 is mounted to a position at a desired height. The camera apparatus 50 can be lifted to a position at a desired height by rotating the screw head 411 of the screw member 41 by using a screw driver.

Subsequently, an operational effect of the mounting apparatus 60 far a camera apparatus will be described.

The mounting apparatus 60 exhibits the operational effect similar to the main operational effect of the mounting apparatus 10 described above. In other words, the mounting member 61 is moved upward and downward between the upper frame 22 and the lower frame 21 by the up-down moving unit 62, and is fixed to an arbitrary position.

Therefore, the camera apparatus 50 can be in use by being drawn down to a desired position from the ceiling surface 11 and being fixed thereto.

In addition, by rotating the screw member 41, the up-down moving nut portion 31 that is provided in the mounting member 61 and is screwed to the screw member 41 moves upward and downward, and thus, it is possible to move the camera apparatus 50 upward and downward.

Therefore, it is possible to cause the mounting member 61 on which the camera apparatus 50 is mounted to stably move upward and downward to a desired position. As a result, an imaging range of the camera apparatus 50 becomes adjustable, and thus, it is possible to widen an application range of the camera installation site.

In addition to the main operational effect, the mounting apparatus 60 has another operational effect to simplify the structure thereof. In other words, in the mounting member 61, the screw member 41 penetrating the up-down moving nut portion 31 penetrates through the guide hole 63. Since the mounting member 61 is supported by the screw members 41 at two places separated from each other in an extension direction of the screw member 41, rotations about the central axis which is orthogonal to the screw member 41 is regulated. Accordingly, the mounting member 61 can make parallel movements along one screw member 41. In addition, in the mounting member 61, the guide slit 64 formed in the rotation regulating piece 68 pinches the guide rib 70 of the interconnecting member 69. The guide slit 64 pinching the guide rib 70 is slidable along the guide rib 70. Therefore, the mounting member 61 can make parallel movements while the rotations thereof are regulated.

In this manner, the up-down moving unit 62 can make the parallel movements by providing one screw member 41 and the guide rib 70. Accordingly, in the mounting apparatus 60 for the camera apparatus in the modification example, compared to the configuration of the mounting apparatus 10 in the embodiment described above, three of the screw members 41, four of the planetary gears 42, and the internal gear 43 can be omitted, thereby making it possible to make the structure of the mounting apparatus to be simple. As a result, component costs and man-hours for assembling are reduced, and thus, it is possible to achieve an inexpensive manufacturing cost.

The moving unit of the mounting apparatus according to the present invention is not limited to the up-down moving unit 40 and the up-down moving unit 62 described above. Alternative moving unit for moving the mounting member between the first frame and the second frame may have a screw mounting structure, for example. In other words, as the moving unit, male screw threads may be cut on the surrounding of the mounting member on which the camera apparatus 50 is mounted, and female screw threads may be provided on the mounting apparatus body side (for example, inner surface of the interconnecting member) so that the camera apparatus 50 is rotated to be mounted thereon (a screw mounting structure of a light bulb and a socket).

The mounting apparatus for a camera apparatus according to the present invention is not limited to the embodiment or modification example described above, and appropriate changes, improvements, and the like can be made.

The present invention can be applied to a mounting apparatus for a camera apparatus that is used when installing a camera apparatus such as a monitoring video camera to be embedded in the ceiling.

A first aspect of the present invention provides a mounting apparatus for a camera apparatus, to be mounted on a mounting surface of a construction to support the camera apparatus, the mounting apparatus including: a first frame; a second frame; an interconnecting member that interconnects the first frame and the second frame; a mounting member that is arranged between the first frame and the second frame, wherein the camera apparatus can be mounted on the mounting member; and a moving unit, configured to move the mounting member between the first frame and the second frame, wherein the mounting member is fixable at an arbitrary position by the moving unit.

The mounting apparatus may be configured so that the moving unit includes a screw member which stands between the first frame and the second frame, and a nut portion provided in the mounting member to be screwed to the screw member.

The mounting apparatus may be configured so that the moving unit includes a plurality of combinations of the screw member and the nut portion.

The mounting apparatus may be configured so that the moving unit includes a guide hole which is formed in the mounting member and supports the mounting member to be horizontally movable by allowing the screw member to penetrate through the guide hole, and a guide slit which is formed in the mounting member and regulates a rotation of the mounting member about the screw member by pinching a guide rib formed in the interconnecting member.

The mounting apparatus may further include a planetary gear which is provided in each of the screw members along any one between the first frame and the second frame, and any one of a sun gear and an internal gear which meshes with the planetary gear.

The mounting apparatus may be configured so that it further includes: a fixing unit, configured to fix the mounting member at an arbitrary position between the first frame and the second frame, wherein the fixing unit including a fixing nut portion which is provided in the screw member, and a regulation member which can regulate a rotation of the fixing nut portion, and the regulation member is selectable in position between a regulated position where the rotation of the fixing nut portion is regulated by being engaged with the fixing nut portion and a deregulated position where the rotation of the fixing nut portion are deregulated by being separated from the fixing nut portion.

The mounting apparatus may further include a cover that is mounted on the second frame to protrude from the mounting surface of the construction.

The mounting apparatus may be configured so that at least a portion of the regulation member protrudes outward from a planar contour of the second frame when the regulation member is in the deregulated position, and the regulation member disallows a cover to be mounted on the second frame.

The mounting apparatus may further include a soft strip member that is fixed to the mounting member and extends to the second frame when the mounting member is in a highest position, wherein the strip member is provided with a marking or a scale.

In the aspects of the present invention, a camera apparatus is mounted on a mounting member that is arranged between a first frame and a second frame. The mounting member is moved upward and downward between the first frame and the second frame by a moving unit and is fixed at an arbitrary position. Therefore, the camera apparatus can be drawn out from a downward-facing surface (ceiling and the like) of a construction to a desired position and fixed at the position, and thus, it is possible to provide a mounting apparatus for a camera apparatus that is effective in being able to be flexibly coordinated with various types of cameras having heights different from each other.

This application is based upon and claims the benefit of priorities of Japanese Patent Applications No. 2013-178016 filed on Aug. 29, 2013 and No. 2014-150910 filed on Jul. 24, 2014, the contents of which are incorporated herein by reference in its entirety.

What is claimed is:

1. A mounting apparatus for a mounting a camera apparatus to a mounting surface to support the camera apparatus, the mounting apparatus comprising:
   a first frame;
   a second frame;
   an interconnecting member that interconnects the first frame and the second frame;
   a mounting member arranged between the first frame and the second frame, wherein the camera apparatus can be mounted on the mounting member;
   a moving unit, configured to move the mounting member between the first frame and the second frame, the moving unit including a plurality of combinations of a screw member and a nut portion, each screw member standing between the first frame and the second frame and each nut portion provided in the mounting member to be screwed to a respective screw member, wherein the mounting member is fixable at an arbitrary position by the moving unit; and
   a planetary gear provided on each of the screw members between the first frame and the second frame; and
   any one of a sun gear and an internal gear which meshes with the planetary gears.

2. A mounting apparatus for mounting a camera apparatus to a mounting surface to support the camera apparatus, the mounting apparatus comprising:
   a first frame;
   a second frame;
   an interconnecting member that interconnects the first frame and the second frame;
   a mounting member arranged between the first frame and the second frame, wherein the camera apparatus can be mounted on the mounting member;

a moving unit, configured to move the mounting member between the first frame and the second frame, the moving unit including a screw member standing between the first frame and the second frame and a nut portion provided in the mounting member to be screwed to the screw member, the moving unit including a guide hole formed in the mounting member and supporting the mounting member to be horizontally movable by allowing the screw member to penetrate through the guide hole and a guide slit formed in the mounting member and regulating a rotation of the mounting member about the screw member by pinching a guide rib formed in the interconnecting member.

3. A mounting apparatus for mounting a camera apparatus to a mounting surface to support the camera apparatus, the mounting apparatus comprising:

a first frame;
a second frame;
an interconnecting member that interconnects the first frame and the second frame;
a mounting member arranged between the first frame and the second frame, wherein the camera apparatus can be mounted on the mounting member;
a moving unit, configured to move the mounting member between the first frame and the second frame, the moving unit including a screw member standing between the first frame and the second frame and a nut portion provided in the mounting member to be screwed to the screw member, wherein the mounting member is fixable at an arbitrary position by the moving unit;
a fixing unit, configured to fix the mounting member at an arbitrary position between the first frame and the second frame, wherein
the fixing unit including a fixing nut portion provided in the screw member, and a regulation member which can regulate a rotation of the fixing nut portion, and the regulation member is selectable in position between a regulated position where the rotation of the fixing nut portion is regulated by being engaged with the fixing nut portion and a deregulated position where the rotation of the fixing nut portion is deregulated by being separated from the fixing nut portion.

4. The mounting apparatus according to claim 3, further comprising:
a cover that is mounted on the second frame to protrude from the mounting surface.

5. The mounting apparatus according to claim 3, wherein at least a portion of the regulation member protrudes outward from a planar contour of the second frame when the regulation member is in the deregulated position, and the regulation member disallows a cover to be mounted on the second frame.

6. A mounting apparatus for mounting a camera apparatus to a mounting surface to support the camera apparatus, the mounting apparatus comprising:

a first frame;
a second frame;
an interconnecting member that interconnects the first frame and the second frame;
a mounting member arranged between the first frame and the second frame, wherein the camera apparatus can be mounted on the mounting member;
a moving unit, configured to move the mounting member between the first frame and the second frame, wherein the mounting member is fixable at an arbitrary position by the moving unit;
a strip member fixed to the mounting member and extends to the second frame when the mounting member is in a highest position, wherein
the strip member is provided with a marking or a scale.

7. The mounting apparatus according to claim 6, wherein the strip member is a soft strip member.

* * * * *